US009154660B2

(12) United States Patent
Goto et al.

(10) Patent No.: US 9,154,660 B2
(45) Date of Patent: Oct. 6, 2015

(54) IMAGE PROCESSING APPARATUS, LOG MANAGEMENT METHOD

(71) Applicant: KYOCERA Document Solutions Inc., Osaka-shi, Osaka (JP)

(72) Inventors: Kazunori Goto, Osaka (JP); Masaru Sato, Osaka (JP); Toshiya Miyai, Osaka (JP); Masaki Kikuchi, Osaka (JP); Jumpei Takagi, Osaka (JP); Keiji Okamura, Osaka (JP); Toru Yasui, Osaka (JP); Ryota Arinobu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/473,861

(22) Filed: Aug. 29, 2014

(65) Prior Publication Data
US 2015/0062639 A1 Mar. 5, 2015

(30) Foreign Application Priority Data
Sep. 3, 2013 (JP) .................................. 2013-182239

(51) Int. Cl.
*G06F 15/00* (2006.01)
*G06F 3/12* (2006.01)
*G06K 1/00* (2006.01)
*H04N 1/00* (2006.01)
*H04N 1/21* (2006.01)

(52) U.S. Cl.
CPC ............. *H04N 1/00954* (2013.01); *H04N 1/21* (2013.01); *H04N 2201/0094* (2013.01); *H04N 2201/218* (2013.01)

(58) Field of Classification Search
CPC ................ H04N 1/00954; H04N 1/21; H04N 2201/0094; H04N 2201/218
USPC .................................. 358/1.15, 1.13, 1.14, 1.1
See application file for complete search history.

(56) References Cited

U.S. PATENT DOCUMENTS

| 7,039,860 B1* | 5/2006 | Gautestad ..................... 715/205 |
| 8,390,844 B2* | 3/2013 | Sekiya .......................... 358/1.15 |
| 2007/0143361 A1 | 6/2007 | Arai et al. |

FOREIGN PATENT DOCUMENTS

| JP | 2003330677 A | 11/2003 |
| JP | 2007166175 A | 6/2007 |

* cited by examiner

*Primary Examiner* — Douglas Tran
(74) *Attorney, Agent, or Firm* — Alleman Hall McCoy Russell & Tuttle LLP

(57) ABSTRACT

An image processing apparatus includes a storage control portion, a setting control portion, and a deletion control portion. The storage control portion stores logs of jobs executed by the image processing apparatus into a storage portion. The setting control portion sets an importance level of each of the logs based on a plurality of target items and weight conditions, wherein the plurality of target items are set in advance with regard to the image processing apparatus, the jobs, or the logs, and the weight conditions are set in advance respectively in correspondence with the target items. The deletion control portion determines an order of automatic deletion of the logs stored in the storage portion, based on the importance level set by the setting control portion.

10 Claims, 6 Drawing Sheets

| TARGET ITEM | CONTENT | WEIGHT VALUE |
|---|---|---|
| SECURITY LEVEL | LOW OR NOT SET | 1 |
| | MIDDLE | 2 |
| | HIGH | 3 |
| | VERY HIGH | 4 |
| NUMBER OF DETECTIONS (TIMES) | $N1 = 0$ | 1 |
| | $1 \leq N1 < 5$ | 2 |
| | $5 \leq N1 < 10$ | 3 |
| | $N1 \geq 10$ | 4 |
| BROWSING FREQUENCY (TIMES/MONTH) | $N2 = 0$ | 1 |
| | $N2 = 1$ | 2 |
| | $N2 = 2$ | 3 |
| | $N2 \geq 3$ | 4 |
| STORAGE PERIOD (DAYS) | $N3 \geq 90$ | 1 |
| | $30 \leq N3 < 90$ | 2 |
| | $7 \leq N3 < 30$ | 3 |
| | $N3 < 7$ | 4 |

| INSTALLATION SITE | WEIGHT VALUE |
|---|---|
| COMMON | 1 |
| BUILDING A | 3 |
| BUILDING B | 2 |
| BUILDING C | 4 |

| DEPARTMENT NAME | DEPARTMENT CODE | WEIGHT VALUE |
|---|---|---|
| A1 | 0001 | 1 |
| A2 | 0002 | 3 |
| A3 | 0003 | 2 |
| A4 | 0004 | 4 |

| USER NAME | USER ID | DEPARTMENT NAME | PASSWORD | WEIGHT VALUE |
|---|---|---|---|---|
| B1 | 0001 | A1 | 1234 | 1 |
| B2 | 0002 | A2 | 5678 | 3 |
| B3 | 0003 | A3 | 9012 | 4 |
| B4 | 0004 | A4 | 3456 | 2 |

| DATA TRANSMISSION DESTINATION | WEIGHT VALUE |
|---|---|
| INSIDE (OR NOT INVOLVING DATA TRANSMISSION) | 1 |
| OUTSIDE | 4 |

| DETECTION FREQUENCY (%) | WEIGHT VALUE |
|---|---|
| $N4 < 5$ | 1 |
| $5 \leq N4 < 10$ | 2 |
| $10 \leq N4 < 15$ | 3 |
| $N4 \geq 15$ | 4 |

IMAGE PROCESSING APPARATUS, LOG MANAGEMENT METHOD

INCORPORATION BY REFERENCE

This application is based upon and claims the benefit of priority from the corresponding Japanese Patent Application No. 2013-182239 filed on Sep. 3, 2013, the entire contents of which are incorporated herein by reference.

BACKGROUND

The present disclosure relates to an image processing apparatus and a log management method for storing logs of jobs into a storage portion.

In image processing apparatuses such as printers, scanners, or the like, logs of various types of jobs, such as a print job, a scan job, or the like, are stored and accumulated in a storage portion. The logs may include image logs generated based on image data which is the processing target of the job. In this type of image processing apparatus, it is known that, when the storage capacity of the storage portion in which the logs are stored has become equal to or lower than a predetermined amount, logs are deleted in order from the oldest log.

SUMMARY

An image processing apparatus according to an aspect of the present disclosure includes a storage control portion, a setting control portion, and a deletion control portion. The storage control portion stores logs of jobs executed by the image processing apparatus into a storage portion. The setting control portion sets an importance level of each of the logs based on a plurality of target items and weight conditions, wherein the plurality of target items are set in advance with regard to the image processing apparatus, the jobs, or the logs, and the weight conditions are set in advance respectively in correspondence with the target items. The deletion control portion determines an order of automatic deletion of the logs stored in the storage portion, based on the importance level set by the setting control portion.

A log management method according to another aspect of the present disclosure includes a storage step, a setting step, and a deletion step. The storage step stores logs of jobs executed by an image processing apparatus into a storage portion. The setting step sets an importance level of each of the logs based on a plurality of target items and weight conditions, wherein the plurality of target items are set in advance with regard to the image processing apparatus, the jobs, or the logs, and the weight conditions are set in advance respectively in correspondence with the target items. The deletion step determines an order of automatic deletion of the logs stored in the storage portion, based on the importance level set by the setting step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A-6E are diagrams showing examples of the weight information and the weight change information used in the image processing apparatus according to an embodiment of the present disclosure.

DETAILED DESCRIPTION

The following describes an embodiment of the present disclosure with reference to the drawings to facilitate understanding of the present disclosure. It should be noted that the following description is an example of an embodiment of the present disclosure and should not limit the technical scope of the present disclosure.

<Outlined Configuration of Image Processing Device 10>

First, with reference to FIGS. 1 and 2, an outlined configuration of an image processing apparatus 10 according to an embodiment of the present disclosure will be described.

Figure 1:
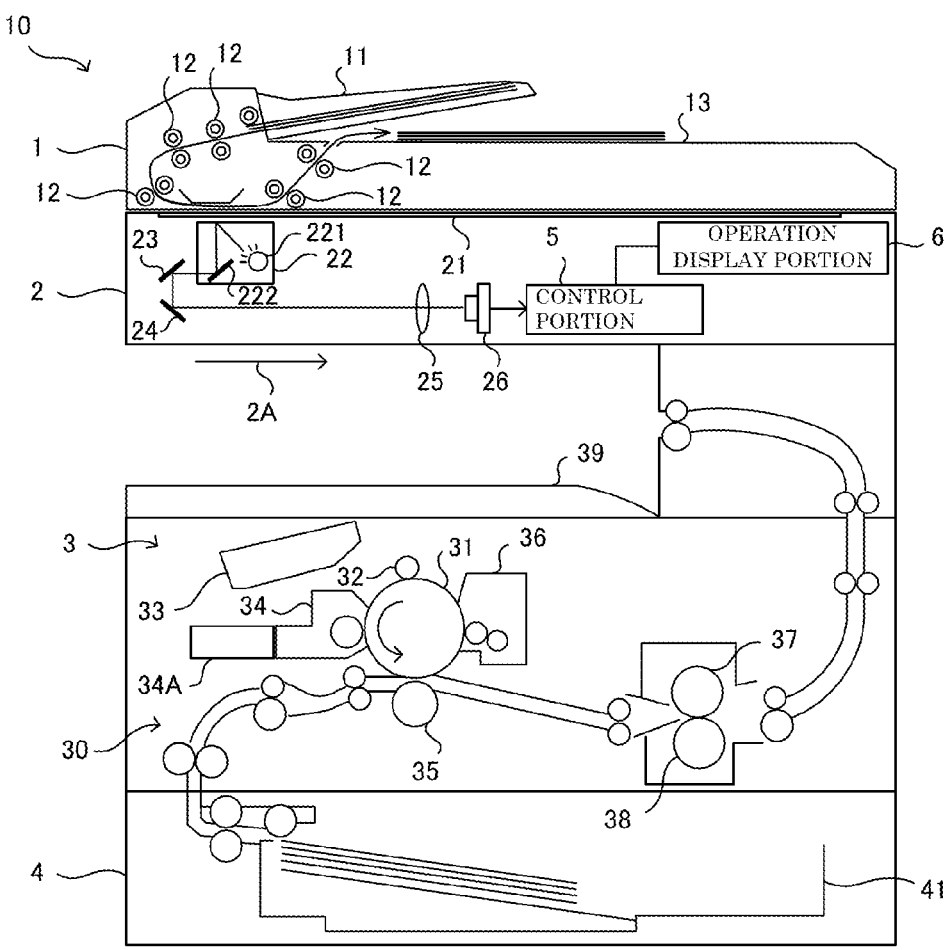
FIG. 1 is a schematic diagram showing an outlined configuration of the image processing apparatus according to an embodiment of the present disclosure.
Figures 2, 3:
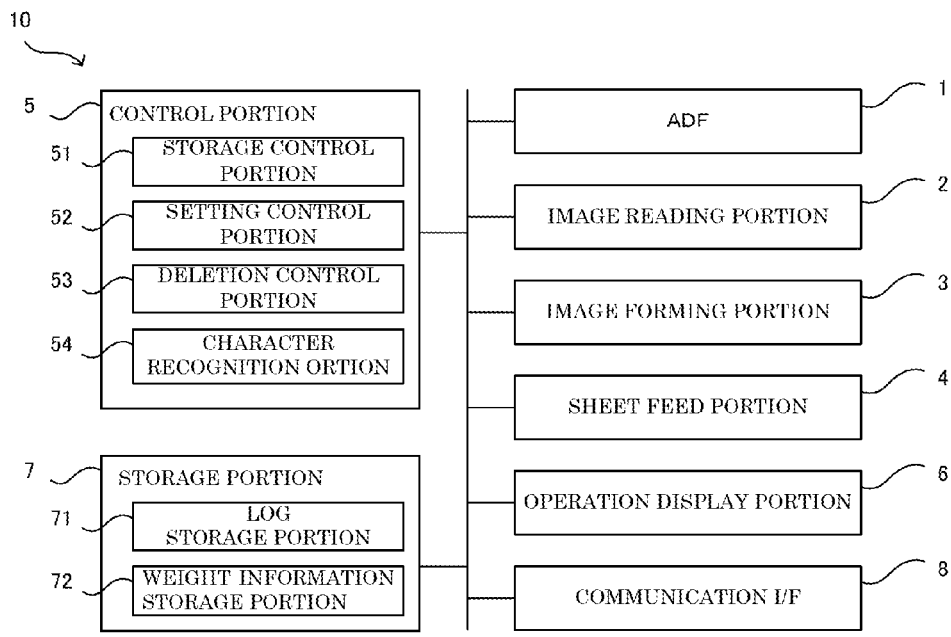
FIG. 2 is a block diagram showing a system configuration of the image processing apparatus according to an embodiment of the present disclosure.
FIG. 3 is a diagram showing an example of the weight information used in the image processing apparatus according to an embodiment of the present disclosure.

As shown in FIGS. 1 and 2, the image processing apparatus 10 is a multifunction peripheral and includes an ADF 1, an image reading portion 2, an image forming portion 3, a sheet feed portion 4, a control portion 5, an operation display portion 6, a storage portion 7, a communication interface (I/F) 8, and the like. It is noted that other examples of the image processing apparatus of the present disclosure include image forming apparatuses and image reading apparatuses such as a printer, a copier, a scanner, a facsimile, and the like.

The ADF 1 is an automatic document sheet feeding device which, by driving a plurality of conveying rollers 12, conveys a document sheet placed in a document sheet placing portion 11 so that the document sheet passes a reading position where it is read by the image reading portion 2, and ends up in a sheet discharge tray 13.

The image reading portion 2 is an image reading portion including a document sheet table 21, a light source unit 22, a mirror 23, a mirror 24, an optical lens 25, and a CCD (Charge Coupled Device) 26, and the like.

The image forming portion 3 is an image forming portion configured to execute an image forming process (printing process) by the electrophotographic printing based on image data read by the image reading portion 2, or based on image data input from an external information processing apparatus such as a personal computer. Specifically, the image forming portion 3 includes a conveying portion 30, a photoconductor drum 31, a charging device 32, an exposure device (LSU) 33, a developing device 34, a transfer roller 35, a cleaning device 36, a fixing roller 37, a pressure roller 38, a sheet discharge tray 39, and the like.

The sheet feed portion 4 sequentially supplies sheets (e.g., paper sheets) one by one from a sheet feed cassette 41 to the image forming portion 3, wherein the sheet feed cassette 41 housing the sheets is attachable/detachable to/from the image processing apparatus 10. After being conveyed to the image forming portion 3, a print sheet is conveyed by the conveying portion 30 to pass through between the photoconductor drum 31 and the transfer roller 35, and then between the fixing roller 37 and the pressure roller 38, and is discharged to the sheet discharge tray 39.

The control portion 5 includes control equipment such as CPU, ROM, RAM or the like. The CPU is a processor for executing various types of arithmetic processes. The ROM is a nonvolatile storage portion in which various types of information such as control programs for causing the CPU to execute the various types of processes are stored in advance. The RAM is a volatile storage portion in which various types of information are stored, and is used as a temporary storage memory (working area) for the various types of processes executed by the CPU.

The control portion 5 performs an overall control over the image processing apparatus 10 by causing the CPU to execute the various types of control programs that have been stored in advance in the ROM. It is noted that the control portion 5 may be formed of an electronic circuit such as an integrated circuit (ASIC or DSP). Alternatively, the control portion 5 may be an engine control portion provided in the image forming portion 3 or the like separately from a main control portion that performs an overall control over the image processing apparatus 10.

The operation display portion 6 includes a display portion such as a liquid crystal display that displays various types of information based on control instructions from the control portion 5. The operation display portion 6 also includes an operation portion, which includes, for example, hardware keys or a touch panel through which various types of information are input to the control portion 5 based on user's operations.

The storage portion 7 is a storage portion, such as EEPROM, hard disk, SSD, or the like, for storing various types of information. The control portion 5 can store and read information to/from the storage portion 7.

The communication I/F 8 is a communication interface configured to connect the image processing apparatus 10 to a network such as the Internet, LAN or the like by wire or wireless means, and perform a data communication with an external apparatus via the network.

In the image processing apparatus 10 configured as described above, the control portion 5 records and deletes logs of jobs such as a print job, a scan job, a data transmission job, and the like that are executed by the image processing apparatus 10. Specifically, as shown in FIG. 2, the control portion 5 includes a storage control portion 51, a setting control portion 52, a deletion control portion 53, and a character recognition portion 54. The control portion 5 functions as the storage control portion 51, setting control portion 52, deletion control portion 53, and character recognition portion 54 when the CPU executes the various types of processes in accordance with the control programs. It is noted that when the control portion 5 is an electronic circuit, the storage control portion 51, setting control portion 52, deletion control portion 53, and character recognition portion 54 are circuit modules that realize the respective functions.

The storage control portion 51 performs a storage step to store logs of the jobs executed by the image processing apparatus 10 into the storage portion 7. Specifically, the storage portion 7 includes a log storage portion 71 for storing logs. The storage control portion 51 stores the logs in the log storage portion 71. Each of the logs includes information such as content of job, an execution date/time of the job, an executor of the job, a storage specification period of the log, a security level of the log, an image log, and the like. Each image log is a piece of information generated by decreasing the resolution of image data which was the processing target of the job, or is an image generated by reducing the image data in size.

Meanwhile, the importance level of a log differs depending on, for example, the content of image data which is the processing target of the job, or the user of the image processing apparatus 10, as well as depending on whether the log is new or old. As a result, if the logs are deleted in order from the oldest log, a log having high usability may be deleted before a log having low usability is deleted. On the other hand, the image processing apparatus 10 according to an embodiment of the present disclosure can determine the importance level of each of the logs multilaterally and retain logs having high usability.

The setting control portion 52 performs a setting step to set the importance level of each of the logs based on a plurality of target items and weight conditions, wherein the plurality of target items are set in advance with regard to the image processing apparatus 10, the jobs or the logs, and the weight conditions are set in advance respectively in correspondence with the target items. The target items include content of job, content of image data which is the processing target of the job, a period for storing a log(hereinafter also referred to as a log storage period), the number of times the log is browsed (hereinafter also referred to as the number of log browsing times), the job security level set by user operations, the installation site of the image processing apparatus, the user of the image processing apparatus, the group to which the user of the image processing apparatus belongs, and the like.

Specifically, the storage portion 7 includes a weight information storage portion 72 for storing weight information D10 that indicates contents of the weight conditions. The setting control portion 52 sets importance levels of the logs based on the weight conditions stored in the weight information D10. The setting control portion 52 also stores the importance levels of the logs into the log storage portion 71 in such a manner that the importance levels respectively correspond to the logs stored in the log storage portion 71.

The deletion control portion 53 performs a deletion step to determine the order of automatic deletion of the logs stored in the log storage portion 71, based on the importance levels that are set by the setting control portion 52. Specifically, when the storable capacity (free capacity) of the log storage portion 71 has become equal to or lower than a first set amount that has been set in advance, the deletion control portion 53 secures the storage capacity of the log storage portion 71 for storing logs by deleting logs from the log storage portion 71 in order from the log having the lowest importance level.

The character recognition portion 54 performs a character recognition step to recognize characters included in the image data. This enables the control portion 5 to retrieve arbitrary characters from the characters in the image data recognized by the character recognition portion 54. It is noted that the character recognition step can be realized by using any of various types of conventionally known methods such as the pattern recognition, and thus the description thereof is omitted here.

[Example of Weight Information]

FIG. 3 is a diagram showing an example of the weight information D10. In the weight information D10 shown in FIG. 3, security level, number of detections, browsing frequency, and storage period are included as the target items. In the weight information D10, the weight conditions are defined as the correspondence between the contents of the target items and the weight values.

The security level is information that is set by the control portion 5 based on user operations input to an external information processing apparatus such as a personal computer, or to the operation display portion 6. Specifically, the security level can be set to one of the four stages: "low (or not set)"; "middle"; "high"; and "very high". In the weight information D10, weight values "1", "2", "3", and "4" are assigned to these stages, respectively. That is, the weight values are assigned to the security levels such that the higher the security level is, the larger the weight value is.

The number of detections indicates the number of predetermined character sets included in the image data that is the processing target of the job executed by the image processing apparatus 10, wherein the predetermined character sets are set in advance. Specifically, the control portion 5 detects the number of predetermined character sets included in the image data that are recognized by the character recognition portion 54 when the log of the job is recorded. The predetermined character sets are information indicating the importance of the image data, such as "For Internal Use Only", "Important", "Confidential", and the like. It is noted that the control portion 5 can register the predetermined character sets based on user operations performed on the operation display portion 6. A value N1 representing the number of detections is classified into the four stages: "0"; "1 or more and less than 5"; "5 or more and less than 10"; and "10 or more". In the weight information D10, weight values "1", "2", "3", and "4" are assigned to these stages, respectively. That is, the weight values are assigned to these stages of the number of detections such that the higher the value N1 representing the number of detections is, the larger the weight value is.

The browsing frequency indicates an average number of times a log was browsed per month (times/month) after the log had been stored in the log storage portion 71 by the image processing apparatus 10. The browsing frequency is stored, by the control portion 5, in the log storage portion 71 in correspondence with each of the logs and is updated after the log is browsed in detail based on operations performed on the operation display portion 6. A value N2 representing the browsing frequency is classified into the four stages: "0"; "1"; "2"; and "3". In the weight information D10, weight values "1", "2", "3", and "4" are assigned to these stages, respectively. That is, the weight values are assigned to the browsing frequency stages such that the higher the browsing frequency value N2 is, the larger the weight value is.

The storage period is represented by the number of days that indicates the period for which a log has been stored after the log was stored in the log storage portion 71 by the image processing apparatus 10. The storage period is calculated as the number of days that have passed since the job execution date/time, when the log of the job was stored by the control portion 5, and each storage period is stored in the log storage portion 71 in association with a corresponding log. It is noted that a storage period stored in the log storage portion 71 is updated when, for example, the date has changed in the system clock of the image processing apparatus 10. A value N3 representing the storage period is classified into the four stages: "90 or more"; "30 or more and less than 90"; "7 or more and less than 30"; and "less than 7". In the weight information D10, weight values "1", "2", "3", and "4" are assigned to these stages, respectively. That is, the weight values are assigned to the storage period stages such that the shorter the storage period of the value N3 is, the larger the weight value is.

[Log Management Process]

Figure 4:
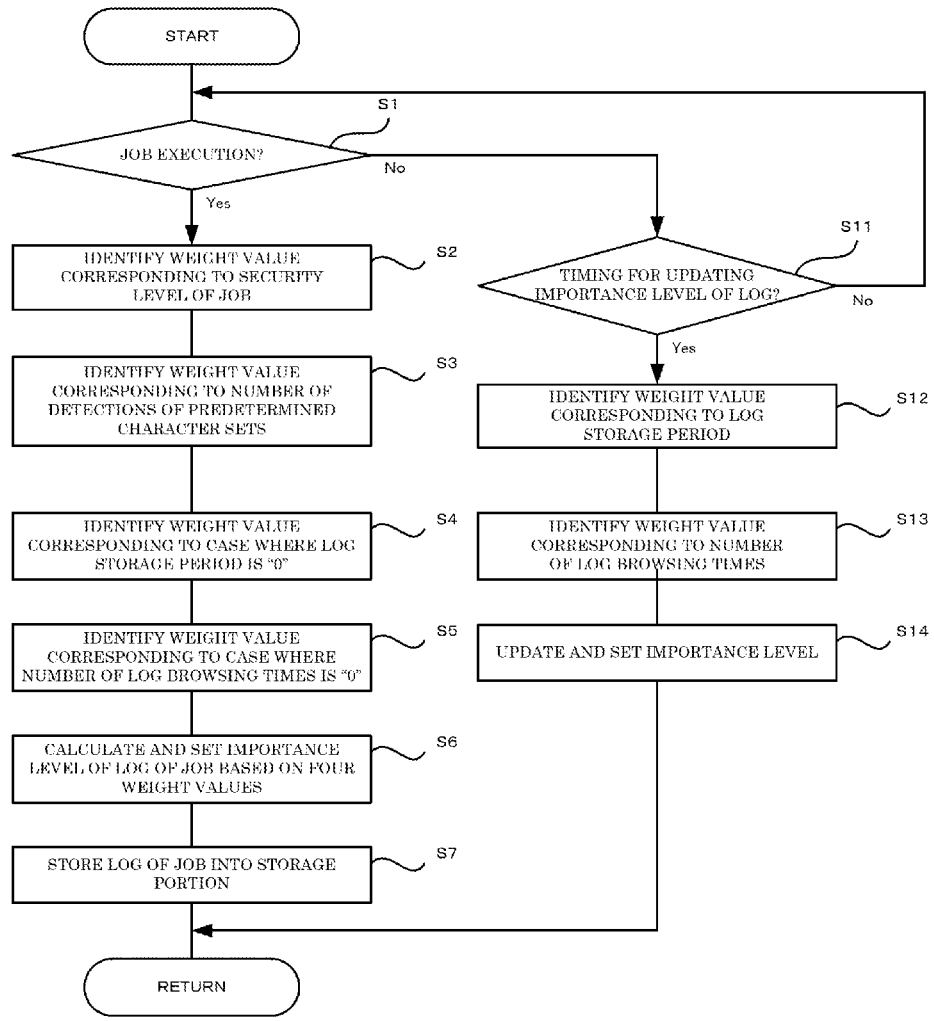
FIG. 4 is a flowchart showing an exemplary procedure of the log management process executed by the image processing apparatus according to an embodiment of the present disclosure.
Figure 5:
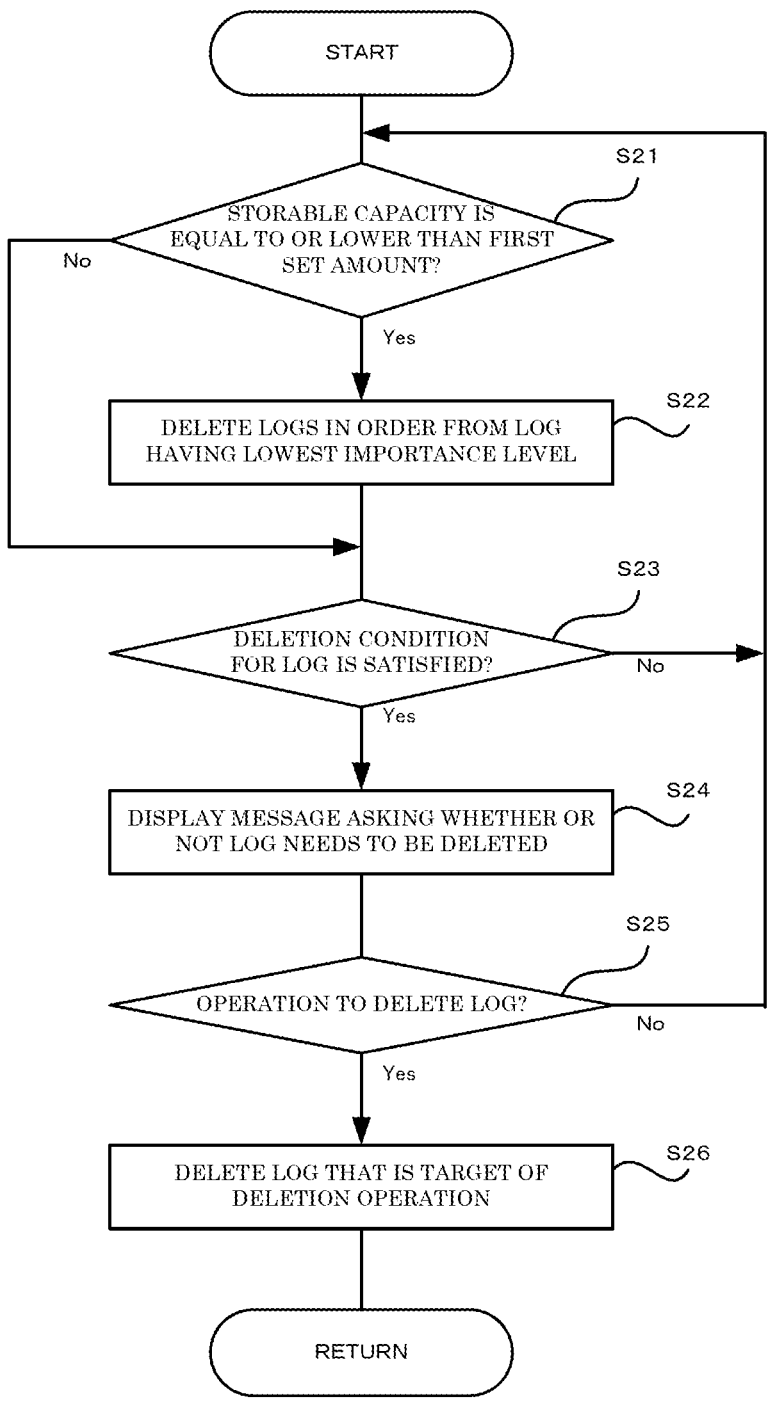
FIG. 5 is a flowchart showing an exemplary procedure of the deletion control process executed by the image processing apparatus according to an embodiment of the present disclosure.

Hereinafter, an exemplary procedure of the log management process executed by the control portion 5 will be described with reference to FIGS. 4 and 5. It is noted that the following description takes, as an example, the case where the weight information D10 (see FIG. 3) is set in advance and stored in the storage portion 7 of the image processing apparatus 10.

<Step S1>

In step S1, the control portion 5 determines whether or not any of the jobs such as the print job, scan job, and data transmission job has been executed in the image processing apparatus 10. Here, upon determining that a job has been executed (Yes side at S1), the control portion 5 moves the process to step S2. In contrast, upon determining that no job has been executed (No side at S1), the control portion 5 moves the process to step S11.

<Step S2>

In step S2, the control portion 5 identifies the weight value corresponding to the security level. Specifically, the control portion 5 identifies the weight value based on the weight information D10 and the security level that was set when the job was requested to be executed. It is noted that when a security level has not been set, the control portion 5 identifies the weight value as "1", which corresponds to "not set".

<Step S3>

In step S3, the control portion 5 identifies the weight value corresponding to the number of detections of predetermined character sets included in the image data that is the processing target of the job. Specifically, the control portion 5 causes the character recognition portion 54 to recognize characters included in the image data and detect the number of predetermined character sets included in the recognized characters. The control portion 5 then identifies the weight value based on the number of detections of predetermined character sets and the weight information D10 stored in the weight information storage portion 72.

It is noted that the control portion 5 may automatically increase by one and increase the security level each time a predetermined character set is detected so that the number of detections of predetermined character sets is reflected on the importance level of the log. Alternatively, when a predetermined character set is detected, the control portion 5 may change the setting of the security level to a predetermined security level that has been set in advance.

<Step S4>

In step S4, the control portion 5 identifies the weight value corresponding to the storage period of the log. Specifically, the control portion 5 identifies the weight value based on the storage period of the log and the weight information D10. At this time in this example, the storage period of the log is "0", and thus the control portion 5 identifies the weight value as "4", which corresponds to log storage period "0".

It is noted that the present description takes, as an example, the case where the weight value is identified based on the log storage period that is measured after the log is stored. On the other hand, in the case where a storage specification period is set as a period for which a log is stored when a job is executed, the weight values may be assigned such that the longer the storage specification period is, the larger the weight value is.

<Step S5>

In step S5, the control portion 5 identifies the weight value corresponding to the number of log browsing times. Specifically, the control portion 5 identifies the weight value based on the number of log browsing times and the weight information D10. At this time in this example, the number of log browsing times is "0", and thus the control portion 5 identifies the weight value as "1", which corresponds to the number of log browsing times "0".

<Step S6>

In step S6, the control portion 5 calculates and sets the importance level of the log based on the four weight values identified in the steps S2 through S5. As understood from this, the control portion 5 setting the importance level of the log during the log management process is the setting control portion 52.

Specifically, the control portion 5 calculates the importance level as the product of multiplying the weight values identified in the steps S2 through S5. For example, in the case where the weight value corresponding to the security level is "2", the weight value corresponding to the number of detections is "3", the weight value corresponding to the log storage period is "4", and the weight value corresponding to the number of log browsing times is "1", the importance level of the log is "24". It is noted that the control portion 5 can set, in advance, which of the security level, the number of detections, the log storage period, and the number of log browsing times are to be used to calculate the importance level, based on user operations performed on the operation display portion 6.

In addition, the control portion 5 may set the importance level based on which among a plurality of predetermined ranges, which are set in advance, the product of multiplying the weight values belongs to. For example, when the product of multiplying the weight values is less than "16", the importance level may be "low"; when the product is "17" or more and less than "32", the importance level may be "middle"; when the product is "33" or more and less than "64", the importance level may be "high"; and when the product is "64" or more, the importance level may be "very high". It is noted that the method of calculating the importance level based on the weight values is not limited to the product of multiplying the weight values, but may be the sum of the weight values, or any other calculation performed based on a calculation expression that is set in advance.

<Step S7>

In step S7, the control portion 5 stores the log of the job into the log storage portion 71 together with the importance level set in the step S6. In addition, the control portion 5 stores the security level and the number of detections of predetermined character sets into the log storage portion 71 together with the log. It is noted that the control portion 5 may store, instead of the security level and the number of detections of predetermined character sets, the weight values corresponding thereto into the log storage portion 71 together with the log.

This makes it possible for the control portion 5 to read information such as the importance level, the security level, the number of detections, and the like in correspondence with each log, from the log storage portion 71. For example, the importance level, the security level, and the number of detections may be stored as part of information of the log. As another example, the importance level, the security level, and the number of detections may be stored, together with information for identifying the log, in the log storage portion 71 as information different from the information of the log.

<Step S11>

On the other hand, while waiting for a job execution (No side at S1), the control portion 5, in step S11, determines, for each of logs stored in the log storage portion 71 for which the importance level had been set, whether or not the timing for updating the importance level has come. Specifically, the control portion 5 determines that the timing for updating the importance level has come when an update condition that has been set in advance is satisfied. The update condition is, for example: the date has changed in the system clock of the image processing apparatus 10; a predetermined period having been set in advance has passed since the previous update of the importance level; the storable capacity of the log storage portion 71 has become lower than a capacity that has been set in advance; detailed information of a log stored in the log storage portion 71 was browsed based on user operations; or the like.

Here, upon determining that the timing for updating the importance level of the log has come (Yes side at S11), the control portion 5 moves the process to step S12. In the step S12 and subsequent steps, the control portion 5 executes an update process to change the importance level of the log. It is noted that the update process is also executed by the setting control portion 52 of the control portion 5. On the other hand, upon determining that the timing for updating the importance level of the log has not come (No side at S11), the control portion 5 moves the process to the step S1.

<Step S12>

In step S12, the control portion 5 reads the log storage period from the log storage portion 71 for each log stored in the log storage portion 71, and identifies the weight value corresponding to the storage period. It is noted that the log storage period may be calculated in the step S12 by the control portion 5.

<Step S13>

In step S13, the control portion 5 reads the number of log browsing times from the log storage portion 71 for each log stored in the log storage portion 71, and identifies the weight value corresponding to the number of log browsing times.

<Step S14>

In step S14, the control portion 5 updates and sets the log importance level stored in the log storage portion 71. Specifically, the control portion 5 re-calculates the importance level of the log based on the log storage period and the number of log browsing times, and the security level and the number of detections of predetermined character sets corresponding to the log stored in the log storage portion 71, and updates the log importance level stored in the log storage portion 71. As understood from this, the control portion 5 sets the importance level of the log based on the plurality of target items, and then changes the importance level of the log based on the log storage period and the number of log browsing times. Of course, the control portion 5 may change the importance level of the log based on either of the log storage period or the number of log browsing times.

It is noted that a predetermined storage period may be set in advance for each log stored in the log storage portion 71, and the control portion 5 may decrease the security level of a log by one each time the predetermined storage period for the log passes. As another example, the number of browsing times per predetermined period may be set in advance for each log stored in the log storage portion 71, and the control portion 5 may increase the security level of a log by one when the number of browsing times per predetermined period of the log is equal to or higher than a predetermined number of times that has been set in advance. Similarly, the control portion 5 may decrease the security level of a log by one when the number of browsing times per predetermined period of the log is less than the predetermined number of times. It is noted that, even in the case where the security level is automatically changed, the control portion 5 may not decrease the security level with regard to a log whose security level is "very high", until a predetermined administrator who has been set in advance performs a deletion operation or a change operation.

[Deletion Control Process]

Hereinafter, an exemplary procedure of the deletion control process executed by the control portion 5 will be described with reference to FIG. 5. It is noted that the following disclosure may be considered as an invention of a log management method for performing each of the log management process and the deletion control process in the image processing apparatus 10.

<Step S21>

In step S21, the control portion 5 determines whether or not the storable capacity of the log storage portion 71 has become equal to or lower than the first set amount. The first set amount is a value that is set in advance to determine whether or not the free capacity of the log storage portion 71 has become small. It is noted that the first set amount may be "0".

Here, upon determining that the storable capacity of the log storage portion 71 has become equal to or lower than the first set amount (Yes side at S21), the control portion 5 moves the process to step S22. In contrast, upon determining that the storable capacity of the log storage portion 71 has not become equal to or lower than the first set amount (No side at S21), the control portion 5 moves the process to step S23.

<Step S22>

In step S22, the control portion 5 automatically deletes logs stored in the log storage portion 71 in order from the log having the lowest importance level, and secures in the log storage portion 71 a storable capacity that is equal to or higher than a second set amount that is set in advance. That is, the control portion 5 determines the order of automatically deleting logs in the steps S21 through S22, based on the importance levels that are set during the log management process by the setting control portion 52. As a result, logs having high importance levels and high usability are accumulated in the log storage portion 71. It is noted that the second set amount is a value larger than the first set amount. It is noted that the control portion 5 may delete a predetermined number of logs from the log storage portion 71 in order from the log having the lowest importance level, wherein the predetermined number is set in advance. It is also noted that deleting logs includes "overwriting" logs stored in the log storage portion 71, as well as "erasing" logs.

In addition, the control portion 5 may set the first set amount and the second set amount based on the amount of information of a log when a job is executed. With this structure, during the execution of the job in the image processing apparatus 10, when the storable capacity for storing the log of the job is not secured in the log storage portion 71, logs stored in the log storage portion 71 are automatically deleted and the storable capacity for storing the log of the job is secured.

<Step S23>

In step S23, the control portion 5 determines, for each log stored in the log storage portion 71, whether or not a deletion condition that has been set in advance is satisfied. The deletion condition may be, for example: the log storage period has reached a predetermined period that has been set in advance; the security level continues to be "1" for a predetermined period; the security level is "1" and the number of log browsing times is equal to or lower than a predetermined number that has been set in advance; or the like.

Here, upon determining that the condition for deletion is satisfied (Yes side at S23), the control portion 5 moves the process to step S24. In contrast, upon determining that the condition for deletion is not satisfied (No side at S23), the control portion 5 moves the process to the step S21.

<Step S24>

In step S24, the control portion 5 displays, on the operation display portion 6, a message and an operation key, wherein the message asks whether or not the log, on which it was determined in the step S23 that the condition for deletion is satisfied, needs to be deleted, and the operation key is used to answer this question. In the case where there are a plurality of logs satisfying the condition for deletion, the logs are displayed in the form of a list. It is noted that the control portion 5 can set, in advance, based on user operations performed on the operation display portion 6, whether or not the message and operation key are to be displayed in the step S24.

<Step S25>

When, in step S25, the operation key displayed on the operation display portion 6 is operated to delete the log(Yes side at S25), the control portion 5 moves the process to step S26. In contrast, when, in step S25, the operation key displayed on the operation display portion 6 is operated not to delete the log(No side at S25), the control portion 5 moves the process to step S21.

<Step S26>

In step S26, the control portion 5 deletes log that satisfy the condition for deletion, from the log storage portion 71. This secures the storable capacity of the log storage portion 71 for storing a log next time.

As described above, the image processing apparatus 10 according to an embodiment of the present disclosure can determine multilaterally the importance levels of the logs of jobs that are to be executed by the image processing apparatus 10, and retain logs having high usability. In addition, according to the image processing apparatus 10, since the calculation expressions used to calculate the importance levels of the logs include the security level that is set arbitrarily by the user, it is possible to reflect the user's intention in the importance of the log.

Another Embodiment

The following describes another embodiment of the image processing apparatus 10 with reference to FIGS. 6A through 6E and FIG. 7. It is noted that structural elements of the image processing apparatus 10 that are the same as those of the embodiment above are omitted to be described.

Specifically, in the image processing apparatus 10 of the other embodiment, weight information D11 through D14 shown in FIGS. 6A through 6D are stored in the weight information storage portion 72, instead of the weight information D10 shown in FIG. 3. The weight information D11 through D14 shown in FIGS. 6A through 6D include, as the target items, the installation site of the image processing apparatus 10, the group (department) to which the user of the image processing apparatus 10 belongs, the user of the image processing apparatus 10, and content of job. In addition, weight change information D21 shown in FIG. 6E is stored in the weight information storage portion 72. Furthermore, in the image processing apparatus 10, the control portion 5 executes a log management process shown in FIG. 7, instead of the log management process shown in FIG. 4.

The weight information D11 shown in FIG. 6A indicates weight values corresponding to installation sites of the image processing apparatus 10. The "installation sites" included in the weight information D11 is information for weighting the states in which the image processing apparatus 10 is used, and is set, for example, during initial setting of the image processing apparatus 10.

The weight information D12 shown in FIG. 6B indicates weight values corresponding to departments and department codes, wherein the departments are set in advance as groups to which users of the image processing apparatus 10 belong. In addition, the weight information D13 shown in FIG. 6C indicates weight values corresponding to users of the image processing apparatus 10 and user IDs. It is noted that the weight information D12 and the weight information D13 are stored as part of registration information that is used for the user management and the department management in the image processing apparatus 10. As a result, information such as the name of the department to which the user belongs, the password used in the login of the user, and the like are stored in the weight information D13 in correspondence with each user of the image processing apparatus 10.

The weight information D14 shown in FIG. 6D indicates weight values corresponding to the case where the data transmission destination is inside and the case where the data transmission destination is outside, when the job is a facsimile transmission, a network scan, a mail transmission, or the like involving a data transmission. It is noted that "inside" indicates inside a range of a company or a group in which the image processing apparatus 10 is installed, and "outside" indicates outside the range of the company or the group in which the image processing apparatus 10 is installed. It is also noted that when the job does not involve the data transmission, the weight value corresponding to the inside is assigned.

The weight change information D21 shown in FIG. 6E is information used as the index for changing the weight values corresponding to the users indicated in the weight information D12. Specifically, the weight change information D21 indicates weight values corresponding to values N4 representing detection frequency of the predetermined character sets included in the image data that is the processing target of the job executed by the image processing apparatus 10. In the image processing apparatus 10, the control portion 5 counts, for each user, the number of jobs executed by the image processing apparatus 10, and the number of predetermined character sets included in the image data that is the processing target of the job, and stores the counted numbers in the storage portion 7. This makes it possible for the control portion 5 to calculate, for each user or for each department to which the users belong to, the value N4 representing the detection frequency of predetermined character sets. It is noted that in the weight change information D21, the value N4 representing the detection frequency is classified into the four stages: "less than 5"; "5 or more and less than 10"; "10 or more and less than 15"; and "15 or more", and weight values "1", "2", "3", and "4" are assigned to these stages, respectively. That is, the weight values are assigned to the detection frequency values such that the higher the detection frequency value N4 is, the larger the weight value is.

[Job Management Process]

Figure 7:
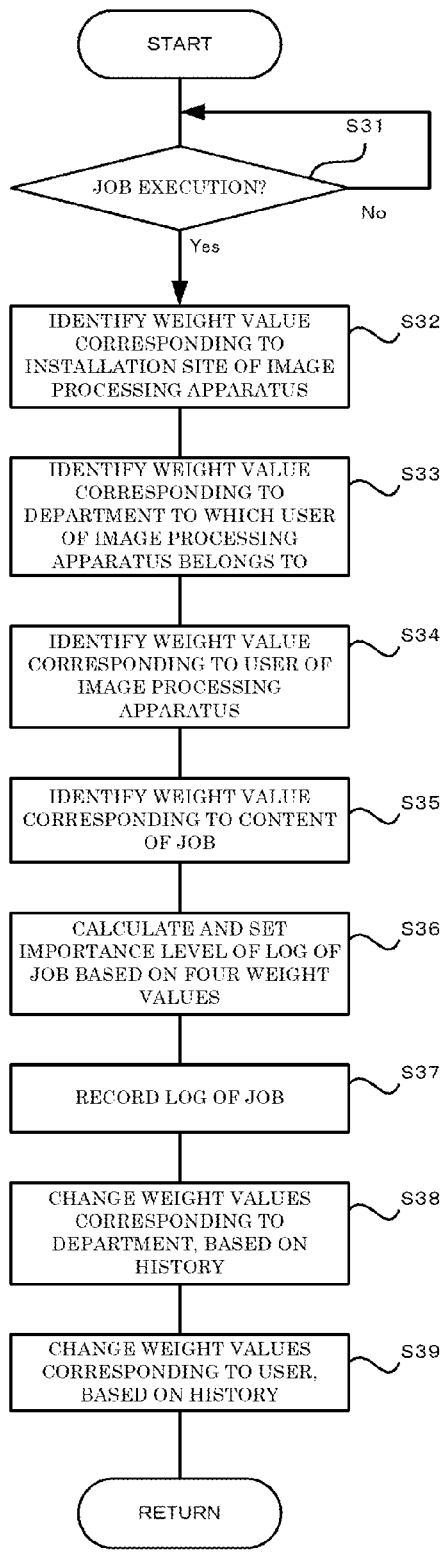
FIG. 7 is a flowchart showing an exemplary procedure of the log management process executed by the image processing apparatus according to an embodiment of the present disclosure.

Hereinafter, an exemplary procedure of the job management process executed by the control portion 5 in the image processing apparatus 10 of the other embodiment will be described with reference to FIG. 7. It is noted that the control portion 5 executes the deletion control process (see FIG. 5) in parallel with the job management process.

<Step S31>

In step S31, the control portion 5 determines whether or not a job has been executed in the image processing apparatus 10. Here, upon determining that a job has been executed (Yes side at S31), the control portion 5 moves the process to step S32. In contrast, upon determining that no job has been executed (No side at S31), the control portion 5 causes the process to wait at step S31.

<Step S32>

In step S32, the control portion 5 identifies the weight value corresponding to the installation site of the image processing apparatus 10. Specifically, the control portion 5 identifies the weight value based on the weight information D11 and the installation site of the image processing apparatus 10 that was set, for example, during the initial setting of the image processing apparatus 10.

<Step S33>

In step S33, the control portion 5 identifies the weight value corresponding to the department to which the user, who requested the image processing apparatus 10 to execute the job, belongs. Specifically, the control portion 5 identifies the weight value based on the weight information D12 and the department to which the user, who is currently logging in the image processing apparatus 10, belongs.

<Step S34>

In step S34, the control portion 5 identifies the weight value corresponding to the user who requested the image processing apparatus 10 to execute the job. Specifically, the control portion 5 identifies the weight value based on the weight information D13 and the user who is currently logging in the image processing apparatus 10.

<Step S35>

In step S35, the control portion 5 identifies the weight value corresponding to the content of the job. Specifically, when the job involves the data transmission, the control portion 5 identifies the weight value based on the weight information D14 and the transmission destination of the data transmission. For example, information indicating which of inside or outside is the transmission destination of the data transmission may be registered in the address book of the image processing apparatus 10 in advance.

Alternatively, the control portion 5 may determine which of inside or outside is the transmission destination of the data transmission, by checking whether or not the domain name of the mail address as the transmission destination of the data transmission is a domain name that has been set in the image processing apparatus 10 in advance. Furthermore, the control portion 5 may determine which of inside or outside is the transmission destination of the data transmission, by checking which of an outside line or an extension line is used for the data transmission. For example, when the transmission destination of the data transmission is a telephone number, the control portion 5 is able to determine which of the outside line or the extension line is used for the data transmission, by checking whether or not information such as the outside line transmission number "0" is input at the start of the telephone number.

<Step S36>

In step S36, the control portion 5 calculates and sets the importance level of the log based on the four weight values identified in the steps S32 through S35. As understood from this, the control portion 5 setting the importance level of the log during the log management process is the setting control portion 52.

Specifically, the control portion 5 calculates the importance level as the product of multiplying the weight values identified in the steps S32 through S35. For example, in the case where the weight value corresponding to the installation site is "2", the weight value corresponding to the department is "3", the weight value corresponding to the user is "4", and the weight value corresponding to the data transmission destination is "1", the importance level of the log is "24". It is noted that the control portion 5 can set, in advance, which of the installation site, the department, the user, and the data transmission destination are to be used to calculate the importance level, based on user operations performed on the operation display portion 6.

In addition, the control portion 5 may set the importance level based on which among a plurality of ranges the product of multiplying the weight values belongs to, wherein the plurality of ranges are set in advance. For example, when the product of multiplying the weight values is less than "16", the importance level may be "low"; when the product is "17" or more and less than "32", the importance level may be "middle"; when the product is "33" or more and less than "64", the importance level may be "high"; and when the product is "64" or more, the importance level may be "very high". It is noted that the method of calculating the importance level based on the weight values is not limited to the product of multiplying the weight values, but may be the sum of the weight values, or any other calculation based on a calculation expression that has been set in advance.

<Step S37>

In step S37, the control portion 5 stores the log of the job into the log storage portion 71 together with the importance level set in the step S36. This makes it possible for the control portion 5 to read information such as the importance level corresponding to each log, from the log storage portion 71. For example, the importance level may be stored as part of information of the log. As another example, the importance level may be stored, together with information for identifying the log, in the log storage portion 71 as information different from the information of the log.

<Step S38>

Subsequently, in step S38, the control portion 5 changes the weight values corresponding to the department stored in the weight information D12, based on the history of the job.

Specifically, each time a job is completed, the control portion 5 causes the character recognition portion 54 to determine whether or not any of the predetermined character sets is present in the image data that is the processing target of the job. The control portion 5 then counts, for each user, the number of jobs executed by the image processing apparatus 10, and the number of predetermined character sets included in the image data that is the processing target of the job, and stores the counted numbers in the storage portion 7. This makes it possible for the control portion 5 to calculate the detection frequency of predetermined character sets, for each user or for each department to which the user belongs to.

After calculating the detection frequency of the predetermined character sets corresponding to the department to which the user belongs to, the control portion 5 changes the weight values of the department indicated in the weight information D12, based on the detection frequency and the weight change information D21. This results in that the higher the frequency of the predetermined character sets corresponding to the department to which the user belongs to is, the larger the calculated value of the importance level is. As understood from this, the setting control portion 52 executes a process of automatically changing weight values corresponding to a department, based on the frequency of the predetermined character sets included in the image data that is the processing target of the job executed by a user who belongs to the department. It is noted that the control portion 5 can set whether or not to automatically change the weight values corresponding to the department, based on the user operations performed on the operation display portion 6.

<Step S39>

Subsequently, in step S39, the control portion 5 changes the weight values stored in the weight information D13 in correspondence with the user, based on the history of the job. Specifically, the control portion 5 calculates the detection frequency of predetermined character sets corresponding to the user, and changes the weight values stored in the weight information D13 corresponding to the user, based on the detection frequency and the weight change information D21. This results in that the higher the frequency of predetermined character sets corresponding to the user is, the larger the calculated value of the importance level is. As understood from this, the setting control portion 52 executes a process of automatically changing weight values corresponding to a user, based on the frequency of the predetermined character sets included in the image data that is the processing target of the job executed by the user. It is noted that the control portion 5 can set whether or not to automatically change the weight values corresponding to the user, based on the user operations performed on the operation display portion 6.

As described above, according to the image processing apparatus 10 of the other embodiment, it is possible to automatically change weight values corresponding to a department or a user, based on the job execution history of each department or each user. As a result, the deletion control process can retain logs that are assumed to be important among logs of jobs executed by the department or the user.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
    a storage control portion configured to store logs of jobs executed by the image processing apparatus into a storage portion;
    a setting control portion configured to set an importance level of each of the logs based on a plurality of target items and weight conditions, wherein the plurality of target items are set in advance with regard to the image processing apparatus, the jobs, or the logs, and the weight conditions are set in advance respectively in correspondence with the target items;
    a deletion control portion configured to determine an order of automatic deletion of the logs stored in the storage portion, based on the importance level set by the setting control portion, wherein
    the target items include content of job, content of image data which is processing target of the job, log storage period, the number of log browsing times, job security level set by user operation, installation site of the image processing apparatus, user of the image processing apparatus, group to which the user of the image processing apparatus belongs;
    the weight conditions are defined as correspondence between contents of the target items and weight values corresponding to the contents of the target items, and
    the setting control portion calculates and sets the importance level of each of the logs based on the weight values corresponding to the contents of the target items.

2. The image processing apparatus according to claim 1, wherein
    after setting the importance level of each of the logs based on the plurality of target items, the setting control portion changes the importance level of each of the logs based on either of or both of the log storage period and the number of log browsing times.

3. The image processing apparatus according to claim 1, further comprising:
    a character recognition portion configured to recognize characters included in the image data, wherein
    a weight condition corresponding to the content of the image data is defined such that the higher the number of predetermined character sets, which are set in advance, included in the characters recognized by the character recognition portion is, the larger a weight value is.

4. The image processing apparatus according to claim 1, further comprising:
a character recognition portion configured to recognize characters included in the image data, wherein
the setting control portion changes a weight value corresponding to a group to which a user of the image processing apparatus belongs to, based on a frequency of a predetermined character set included in the image data that is a processing target of the job executed by the user who belongs to the group, the predetermined character set being set in advance.

5. The image processing apparatus according to claim 1, further comprising:
a character recognition portion configured to recognize characters included in the image data, wherein
the setting control portion changes a weight value corresponding to a user of the image processing apparatus, based on a frequency of a predetermined character set included in the image data that is a processing target of the job executed by the user, the predetermined character set being set in advance.

6. A log management method comprising:
a storage step of storing logs of jobs executed by an image processing apparatus into a storage portion;
a setting step of setting an importance level of each of the logs based on a plurality of target items and weight conditions, wherein the plurality of target items are set in advance with regard to the image processing apparatus, the jobs, or the logs, and the weight conditions are set in advance respectively in correspondence with the target items;
a deletion step of determining an order of automatic deletion of the logs stored in the storage portion, based on the importance level set by the setting step:
the target items include content of job, content of image data which is processing target of the job, log storage period, the number of log browsing times, job security level set by user operation, installation site of the image processing apparatus, user of the image processing apparatus, group to which the user of the image processing apparatus belongs;
the weight conditions are defined as correspondence between contents of the target items and weight values corresponding to the contents of the target items, and
the setting step calculates and sets the importance level of each of the logs based on the weight values corresponding to the contents of the target items.

7. The log management method according to claim 6, wherein
after setting the importance level of each of the logs based on the plurality of target items, the setting step changes the importance level of each of the logs based on either of or both of the log storage period and the number of log browsing times.

8. The log management method according to claim 6, further comprising:
a character recognition step of recognizing characters included in the image data, wherein
a weight condition corresponding to the content of the image data is defined such that the higher the number of predetermined character sets, which are set in advance, included in the characters recognized by the character recognition step is, the larger a weight value is.

9. The log management method according to claim 6, further comprising:
a character recognition step of recognizing characters included in the image data, wherein
the setting step changes a weight value corresponding to a group to which a user of the image processing apparatus belongs to, based on a frequency of a predetermined character set included in the image data that is a processing target of the job executed by the user who belongs to the group, the predetermined character set being set in advance.

10. The log management method according to claim 6, further comprising:
a character recognition step of recognizing characters included in the image data, wherein
the setting step changes a weight value corresponding to a user of the image processing apparatus, based on a frequency of a predetermined character set included in the image data that is a processing target of the job executed by the user, the predetermined character set being set in advance.

* * * * *